US011119566B2

(12) United States Patent
Chang et al.

(10) Patent No.: US 11,119,566 B2
(45) Date of Patent: Sep. 14, 2021

(54) SYSTEM AND METHOD FOR A VIRTUAL REALITY MOTION CONTROLLER

(71) Applicants: Kevin Chaohwa Chang, Los Angeles, CA (US); Emanuel Yosef Druckmann, Stevenson Ranch, CA (US)

(72) Inventors: Kevin Chaohwa Chang, Los Angeles, CA (US); Emanuel Yosef Druckmann, Stevenson Ranch, CA (US)

(73) Assignees: Kevin Chang, Los Angeles, CA (US); Emanuel Druckmann, Stevenson Ranch, CA (US)

( * ) Notice: Subject to any disclaimer, the term of this patent is extended or adjusted under 35 U.S.C. 154(b) by 458 days.

(21) Appl. No.: 15/830,802

(22) Filed: Dec. 4, 2017

(65) Prior Publication Data
US 2018/0299947 A1 Oct. 18, 2018

Related U.S. Application Data (60) Provisional application No. 62/485,415, filed on Apr. 14, 2017.

(51) Int. Cl.
*G06F 3/01* (2006.01)
*A63F 13/212* (2014.01)
(Continued)

(52) U.S. Cl.
CPC .......... *G06F 3/011* (2013.01); *A63F 13/211* (2014.09); *A63F 13/212* (2014.09); *A63F 13/25* (2014.09);
(Continued)

(58) Field of Classification Search
CPC .......... G06F 3/011; G06F 3/017; G06F 1/163; A63F 13/211; A63F 13/212; G06T 19/003; G06T 19/006
See application file for complete search history.

(56) References Cited

U.S. PATENT DOCUMENTS

| 6,070,269 A | 6/2000 | Tardif et al. |
| 7,042,440 B2 | 5/2006 | Pryor et al. |

(Continued)

FOREIGN PATENT DOCUMENTS

| CN | 104461013 A | 3/2015 |
| WO | 2010075481 A1 | 7/2010 |

OTHER PUBLICATIONS

Avatar VR, Motion Capture Chest Strap, NeuroDigital Technologies Web-Site, URL: https://www.neurodigital.es/avatarvr/.

*Primary Examiner* — Christopher E Leiby
(74) *Attorney, Agent, or Firm* — M&B IP Analysts, LLC (57) ABSTRACT

A system and method for generating motion commands based on detected motion of a user, the system including: a processing circuitry; an orientation sensor; a communication interface; and a housing having the processing circuitry, the orientation sensor, and the communication interface disposed therein, the housing further configured to be securely fastened to a body of a user; wherein the orientation sensor is configured to provide sensor readings indicative of a three-dimensional motion of a user; wherein the processing circuitry is configured to receive the sensor readings from the orientation sensor; determine an initial reference position based on the sensor readings; determine a current user position based on the sensor readings; and determine the motion commands based on an angle between the current user position and the initial reference position; and wherein the communication interface is configured to relay the motion commands to a VR device.

21 Claims, 7 Drawing Sheets

(51) Int. Cl.
　　　*A63F 13/211*　　　(2014.01)
　　　*G06F 1/16*　　　　(2006.01)
　　　*G06F 3/0346*　　　(2013.01)
　　　*A63F 13/25*　　　 (2014.01)
　　　*A63F 13/5255*　　 (2014.01)
　　　*G06T 19/00*　　　 (2011.01)

(52) U.S. Cl.
　　　CPC .......... *A63F 13/5255* (2014.09); *G06F 1/163* (2013.01); *G06F 3/017* (2013.01); *G06F 3/0346* (2013.01); *G06T 19/003* (2013.01); *G06T 19/006* (2013.01)

(56) References Cited

U.S. PATENT DOCUMENTS

| | | | |
|---|---|---|---|
| 9,595,083 | B1 * | 3/2017 | Smith ................ G06T 19/20 |
| 2014/0035805 | A1 * | 2/2014 | Minnen ............... G06F 3/017 |
| | | | 345/156 |
| 2016/0098095 | A1 | 4/2016 | Gonzalez-Banos et al. |
| 2017/0011210 | A1 * | 1/2017 | Cheong ............... H04W 12/06 |
| 2017/0243327 | A1 * | 8/2017 | Zhang ................. G06F 3/017 |
| 2017/0357327 | A1 * | 12/2017 | Dimitrov ............. G06F 3/012 |
| 2018/0028896 | A1 * | 2/2018 | Ray .................... A63B 71/0622 |
| 2018/0081439 | A1 * | 3/2018 | Daniels ............... G06F 1/163 |

* cited by examiner

SYSTEM AND METHOD FOR A VIRTUAL REALITY MOTION CONTROLLER

CROSS-REFERENCE TO RELATED APPLICATIONS

This application claims the benefit of U.S. Provisional Application No. 62/485,415 filed on Apr. 14, 2017, the contents of which are hereby incorporated by reference.

TECHNICAL FIELD

The present disclosure relates generally to virtual reality devices, and more specifically, to devices using user body movements to send signals to a virtual reality system.

BACKGROUND

The virtual reality (VR) space is a fast-growing area of computer graphics and visual media where it is possible to transport people to worlds in a way that was previously unavailable with traditional gaming, movies, and television. Using a VR headset, users are able to stand right in the middle of the action, world, or scene, adding a layer of immersion that helps connect audiences to the story being unfolded in front of their eyes.

There are currently many different uses for VR being explored, all aimed to further engage audiences beyond traditional media methods. The most common application at the moment is for gaming, specifically to add a level of detail and experience for players when it comes to first-person genre game play. Similarly, it can also be used for storytelling or documentaries where experiencing an event through someone else's eyes is crucial to capturing or conveying an emotion for the piece. For example, following along as a soldier navigates a dangerous stretch of enemy territory can help users empathize with the stress and anxiety of being in that situation. VR in this case is the difference between "living" the experience with the subject versus as a removed viewer.

While people are beginning to better understand and unlock the potential that VR provides through use of a VR headset, there is one element of the space that is still largely unexplored, which is how to move within the scene. There are a number of methods currently being explored that help people navigate in VR scenes. The most common is the category of handheld controllers with buttons and controls that move the camera or viewer around the scene. There are also wand-like controllers that allow users to navigate by waving it around via gesture commands. Lastly, there is the method of translating in the scene where a user looks at preset locations within the scene using the VR headset to teleport or jump between different locations. Regardless of the method, these types of controls still present a drawback and limitation for the user, which is the disconnect between what the user is seeing and what is being experienced by the rest of his or her body.

In traditional gaming and movies, users experience the media through a 2D television or computer monitor screen, which separates the sensation of watching someone moving on screen and physically moving in real life. However, this distinction gets blurred in VR due to the added immersion of the VR headset. With the headset on, watching and experiencing movement in VR can and often does feel like movement in real life which triggers some users to instinctively move as they experience motion wearing the headset. This sensation can be disjointed if the user attempts to use a traditional controller to navigate a scene, because while the movement is occurring in the headset, the user is typically standing still or sitting, so the brain and eyes are perceiving motion while the body is stationary. The best-case scenario when using a controller in this situation is that users will adjust and adapt to this conflicting sensation, but in any other case, it will lead to a less engaging experience and can remove the user from the "reality" of being in the scene, defeating the main benefit of the VR experience.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a virtual reality (VR) motion controller, having a processing circuitry; an orientation sensor; a communication interface; and a housing having the processing circuitry, the orientation sensor, and the communication interface disposed therein, the housing further configured to be securely fastened to a body of a user; where the orientation sensor is configured to provide sensor readings indicative of a three-dimensional motion of a user; where the processing circuitry is configured to receive the sensor readings from the orientation sensor; determine an initial reference position based on the sensor readings; determine a current user position based on the sensor readings; and determine the motion commands based on an angle between the current user position and the initial reference position; and where the communication interface is configured to relay the motion commands to a VR device.

Certain embodiments disclosed herein also include a method for generating motion commands based on detected motion of a user, including: determining an initial reference position; determining a current user position based on the initial reference position; determining motion commands based on the determined current user position; and sending the motion commands to a VR device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for a virtual reality (VR) motion controller to be used with a VR system. A VR system includes a VR headset that may be used with the present disclosure, as will be described herein. The use of the term VR headset in this application simply describes any virtual reality device to be worn by a user containing a screen that allows a user to view a 3D experience, where the screen may be a smartphone attached to a wearable device or built into the unit itself. Examples of VR headsets include the Google® Cardboard, PlayStation® VR Headset, and Oculus® Rift®. The present disclosure described below can connect to a VR headset and send signals to the VR system to allow users to control their motion inside a 3D scene being shown with their body movements.

Figure 1A:
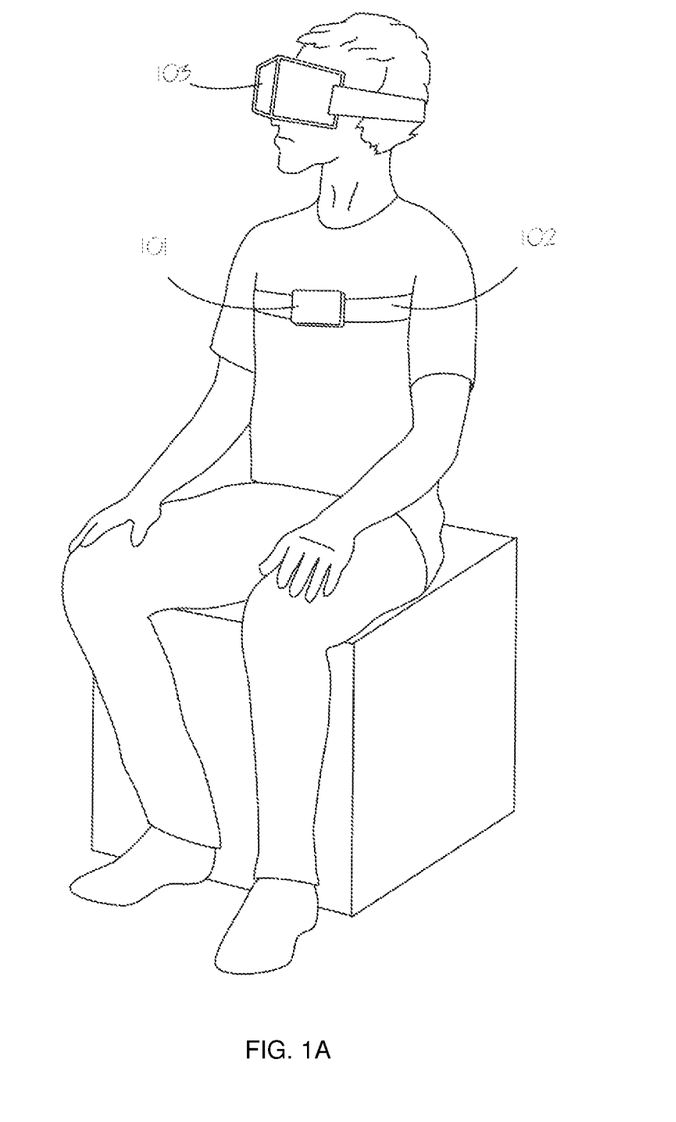
FIG. 1A is a perspective view of a user wearing the controller and a VR headset in a seated position according to an embodiment.
Figure 1B:
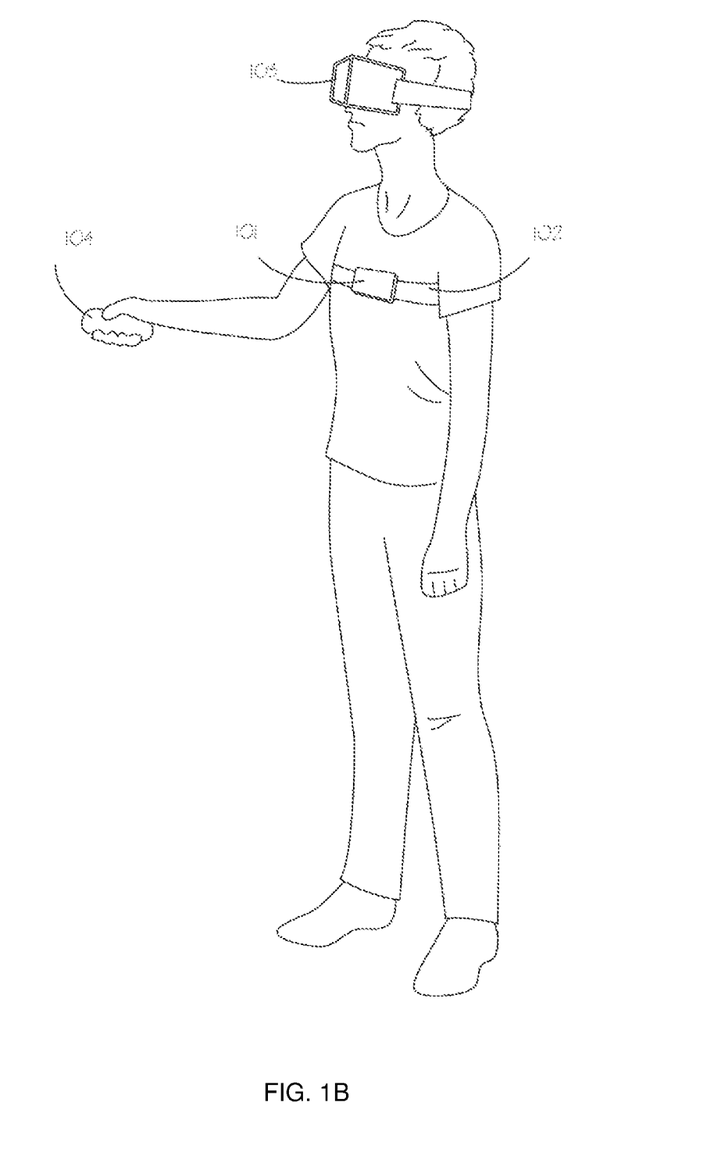
FIG. 1B is a perspective view of a user wearing the controller, a VR headset, and a motion wand in a standing position according to an embodiment.

FIGS. 1A and 1B show perspective views of a user wearing a VR motion controller 101 and a VR headset 103. In an embodiment, the VR motion controller 101 includes at least one orientation sensor configured to detect motions and accelerations (not shown in FIG. 1). In an embodiment, the VR motion controller 101 is secured to a user by a strap 102, such as, but not limited to a chest strap.

The strap 102 is sufficiently tightened against the user's body (e.g., chest) so as to ensure that any motion performed by the user will create clean and accurate orientation sensor readings. Such readings are then translated into desired motion commands for use within the VR system.

It should be appreciated that securing the strap to the chest provides accurate sensor readings of user motions. Alternatively, attaching the controller 101 to another part of the body, such as the hand or wrist, will often record user movements that are not intended to be commands for the VR system. For example, a user could easily flick a hand inadvertently while their torso remains stationary. As such, if the VR motion controller 101 is attached to a hand, stretching out an arm would cause a motion command to be sent to the VR system, even though the user has not rotated or shifted their body position.

Thus, in a preferred embodiment, the chest is the most optimal position for an orientation sensing device for a VR system designed to relay motions intended to mimic realistic user motions. As shown in FIG. 1A, this configuration may even be implemented in a seated position, where a user can simply turn or lean their body in a desired direction, which is then imparted to the VR system via the controller 101.

The VR motion controller 101 is worn in tandem with a VR headset 103, and is connected thereto via a wired or wireless connection. In addition, further VR accessories may be used simultaneously as well, such as a wand 104 shown in FIG. 1B, configured to relay various specialized commands, e.g., the firing of a weapon or the execution of a specific maneuver.

The VR system may include a console (not shown) connected to the VR headset and to the VR motion controller 101 configured to execute applications and process 3D scenes for viewing. Alternatively, the VR system may include a user device (not shown), such as a smartphone or tablet, that is mountable within the VR headset which is configured to execute applications as well as be implemented as a VR display.

Figure 2:
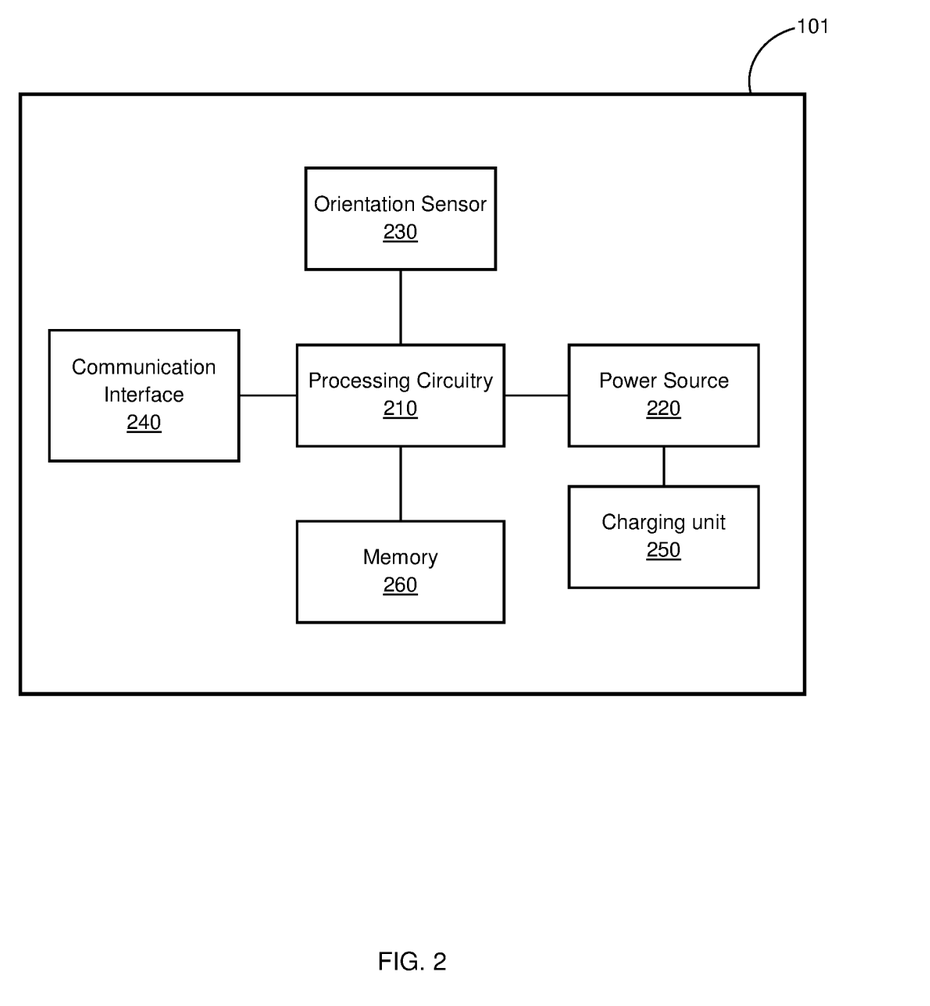
FIG. 2 is a block diagram of the virtual reality motion controller according to an embodiment.

FIG. 2 is a block diagram of the VR motion controller 101 designed according to an embodiment. The VR motion controller 101 includes a processing circuitry 210 connected to an orientation sensor 230 and a power source 220. The power source 220 may include a rechargeable battery connected to a charging unit 250, which would allow the controller 101 to be recharged after use without having to replace the batteries, while ensuring cord-free operation.

The orientation sensor 230 may include components configured to measure both motion and acceleration, such as an accelerometer, allowing the tracking not only of a user's position, but also of the speed and direction in which they move. These recordings can enhance a VR system's ability to convincingly reproduce the illusion of a user being present within a 3D scene.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 210 is further connected to a communication interface 240 that is configured to connect to various components of a VR system, such as a VR headset or wand. In an embodiment, the communication interface 240 is configured to connect wirelessly to the VR system using wireless communication protocols, such as Bluetooth®, Near Field Communication (NFR), WiFi, WiGig and the like. In an alternative embodiment, the communication interface 240 of the controller 101 is configured to connect to a VR system via a wired connection using USB, HDMI, DisplayPort cables and the like.

In an embodiment, the VR motion controller 101 may further include memory 260 configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to determine motion and acceleration via the orientation sensor 230 and to send the orientation data to a connected VR headset via either a wired or a wireless connection.

Figure 3:
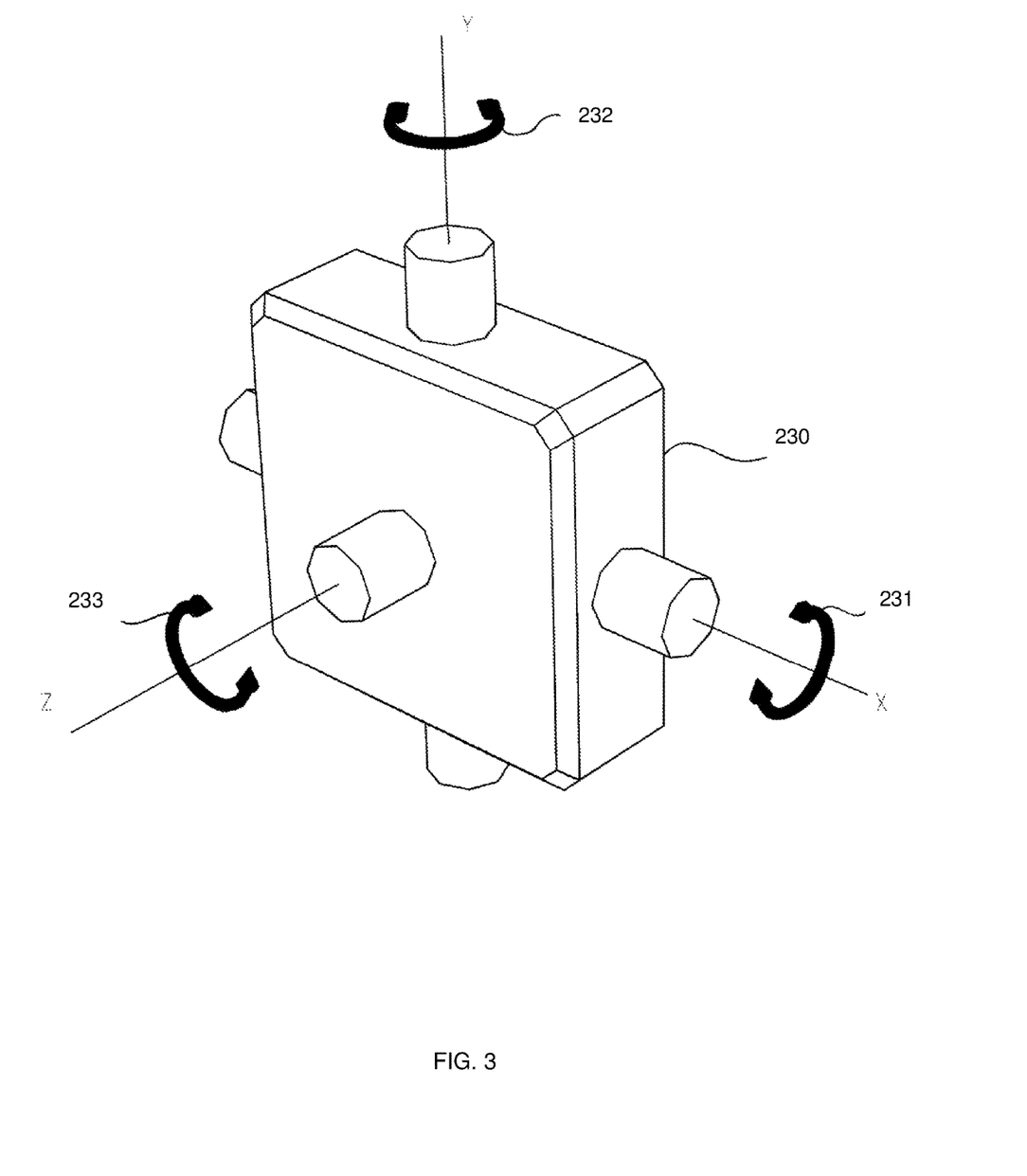
FIG. 3 is a schematic diagram of an orientation sensor found within the virtual reality motion controller according to an embodiment.

FIG. 3 is a schematic diagram of the orientation sensor 230 operable in the VR motion controller 101 according to an embodiment. The orientation sensor 230 is configured to monitor at least six different types of motion as shown in FIG. 3, with two degrees of strength for each of those motions, for a total of 12 commands that can be sent to the VR headset. The types of motion include a pitch 231, a yaw 232, and a roll 233 of the orientation sensor with respect to a reference frame. That is, if the orientation sensor 230 has rotated in a positive or negative direction for each of the pitch 231, yaw 232, and roll 233.

Any combination of the readings 231, 232, and 233 can be translated into specific motion directions. As an example shown in FIG. 4, the directions may indicate if a user has leaned forward 404 or backward 405, moved, or strafed, left 407 or right 406, or rotated clockwise 408 or counterclockwise 409. The motion directions 404-409 can be translated to commands available to be sent to a VR system from the VR motion controller 101.

Figure 4:
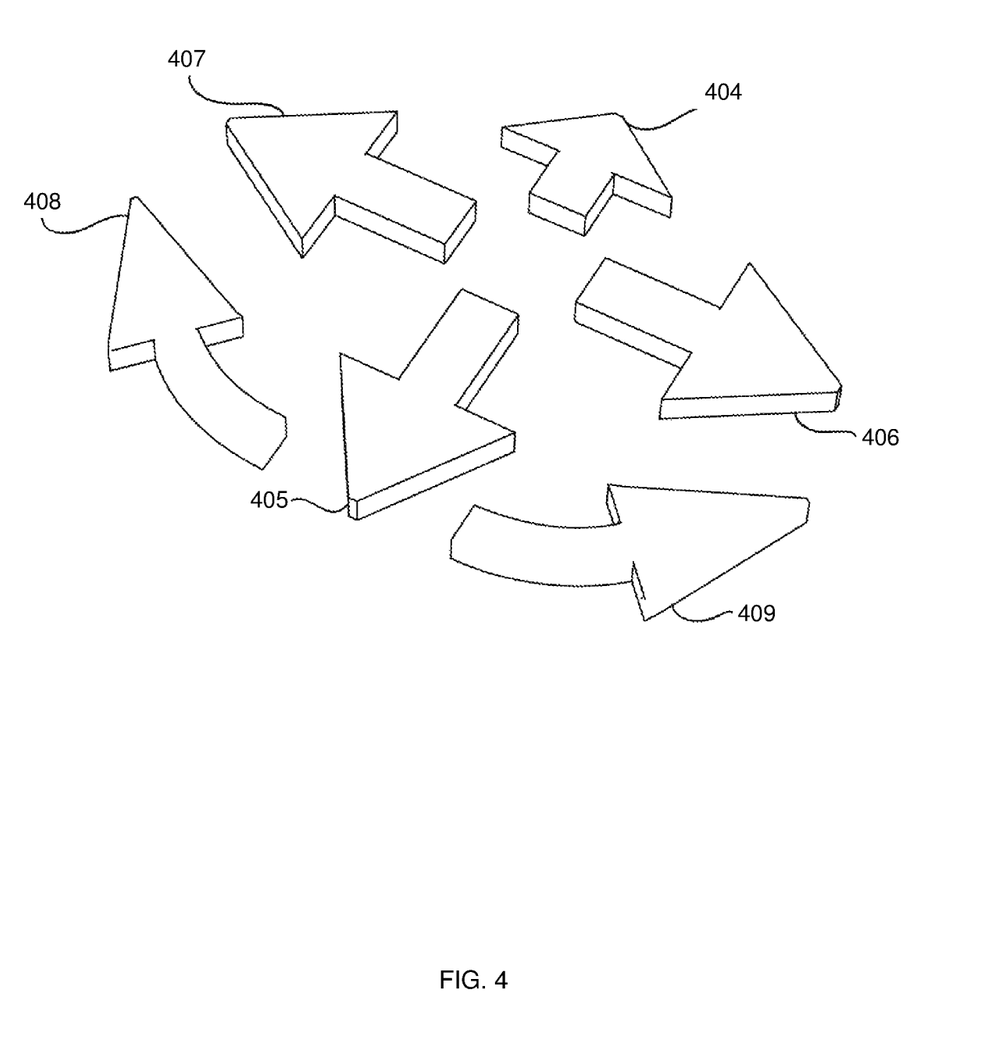
FIG. 4 is a schematic diagram of the commands available to be sent to a VR system from the virtual reality motion controller according to an embodiment.

In addition to the direction, the command may designate the speed of the motion in that particular direction. That is, two different strengths of motion may be measured, depending on how much the user leans or rotates with his or her body and how quickly they do so. For a forward move motion, for example, if the user does a slight lean forward, it will register it as a "walk" forward command, and if the user continues to lean forward beyond that, can register it as a "run" forward command instead. The same applies for each of the other commands, whether moving backwards, leaning left or right, or rotating clockwise or counterclockwise For example, the commands may include: forward walk, forward run, backward walk, backward run, strafe (i.e., to move laterally sideways without rotating) left walk, strafe left run, strafe right walk, strafe right run, rotate left walk, rotate left run, rotate right walk, and rotate right run.

In an embodiment, the readings of the orientation sensor 230 are translated into a direction and then to a command based on the strength of a signal indicative of the motion readings (231, 232, or 233, FIG. 3) and the frequency of change in the motion readings.

In an example embodiment, a threshold is implemented to determine a speed of a motion (e.g., a walk and/or a run) and may be adjustable based on user preferences. For example, when seated, a user may wish to use a lower threshold, such that a smaller range of motion registers as a run. Likewise, when standing, a user may wish to use a higher threshold, requiring more motion (e.g., a large movement forward) to indicate a run as opposed to a walk command. Further, for each motion reading a configurable threshold can be utilized to determine the desired command based on the sensor readings. The utilization of the thresholds to determine the motion and its speed are discussed below.

Additionally, in an embodiment, the VR motion controller 101 may send any of the commands as keyboard or joystick commands. For example, a certain motion can be linked to a specialized keyboard combination to send a specialized command to the VR system.

In the previously mentioned embodiment, twelve commands can be sent based on the recorded motions, allowing for twelve main movements in a 3D space. Those commands may include: forward walk, forward run, backward walk, backward run, strafe (i.e., move laterally sideways without rotating) left walk, strafe left run, strafe right walk, strafe right run, rotate left walk, rotate left run, rotate right walk, and rotate right run. Leaning forward leads to a forward walk or run command. Leaning backwards leads to a backward walk or backward run command in the scene. Leaning or tilting left leads to a left strafe walk or run, where, e.g., a character moves left in a scene while maintaining a forward oriented direction. Leaning right does the same in the right direction. Finally, the user turning his or her body counterclockwise leads to a rotate or turn left walk or run, where the character in the 3D scene rotates counterclockwise or left and essentially rotates the forward look direction while staying stationary. The same applies to a turn in the clockwise direction which leads to a turn clockwise or directional right in the scene.

Each of the move commands has areal threshold in a general direction on top of the strength threshold to determine the speed of the motion (e.g., a walk versus a run). This threshold is the area of effect that allows the move to be triggered, similar to a zone of movement. In other words, if a user is interested in moving forward, the VR motion controller 101 can be configured such that any degree of leaning forward can trigger a move command, and the direction does not need to necessarily be in a direct line forward along the "forward" axis. This allows for overlapping zones so that it is possible to trigger multiple commands simultaneously, such that a move forward and a strafe right can cause a user to move diagonally right within the 3D scene while facing forward. Depending on the degree of the motion, these simultaneous movements can be a translated as a walk, a run, or any combination thereof, based on the orientation and strength of motion for each separate command. This type of simultaneous motion better mimics how users move in real life scenarios, providing a more natural experience within the VR scene.

The commands sent by the controller to the VR headset can be either in digital or analog signal format. This allows for flexibility in how the commands are received and handled depending on the hardware and software being used in the VR system. In addition, an analog signal may provide a more granular strength of motion beyond walking and running by sending a continuous move value versus separate specific walk or run commands, so that the controller can behave more similarly to a game joystick in addition to sending keyboard controls. The forward and backward motions on the joystick would map to the forward and backward move commands. Left and right would map to strafe left and strafe right, and twisting left and twisting right on the joystick would map to a rotate left and rotate right.

It should be noted that while one embodiment of the controller 101 focuses on twelve main commands that are used to move in 3D space, the controller 101 may be programmed to handle as many commands as desired based on different user motions.

Figure 5:
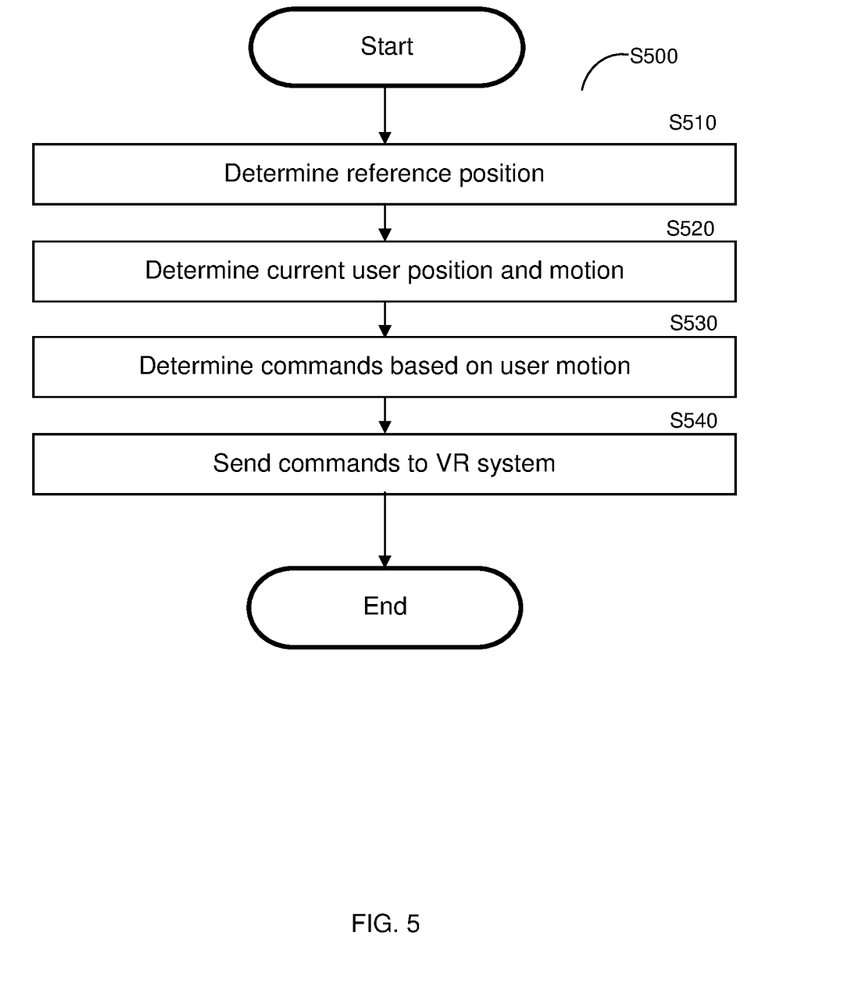
FIG. 5 is a flowchart of the method used by the virtual reality motion controller according to an embodiment.

FIG. 5 is a flowchart of the method 500 used by the virtual reality motion controller according to an embodiment. The trigger for a command is sent from the VR motion controller when motion from at least one of the twelve aforementioned potential movements is detected, based off of a calculated initial reference position.

At S510, an initial reference position is calculated and established, such that all subsequent calculations can be made in reference to the initial reference position.

At S520, a subsequent measurement of a user's position is determined with respect to the initial reference positions. The position may be determined by calculating any change in rotational value along any of the axes of rotation, e.g., roll, yaw and pitch, and assigned a quaternion value compared to the initial reference position. For example, the orientation sensor may detect that a user has leaned forward and slightly to the left. The position is determined by calculating how far forward and sideways the orientation sensor has moved relative to its starting reference position.

It is further determined if the user is currently in motion. That is, if a movement or acceleration is detected and if so, what the direction of the movement or acceleration is. The motion and acceleration can be determined by calculated the rate of change of position over a period of time. For example, as discussed above, a steeper angle may be determined to indicate a running command, while a shallower angle may be determined to be a walking command. In an alternative embodiment, the desired command, e.g., running or walking, may be determined based on an acceleration detected by the orientation sensor.

In an embodiment, to properly calculate the user position, a current quaternion reading from the orientation sensor is taken and compared to the initial reference position reading, and the difference is used to determine how the user is moving while wearing the controller. To simplify the calculations and help visualize the movements of the controller in a 3D space, the controller is configured to solve for all of the movements in a coordinate space along one axis.

To this end, a determination is made if the user is leaning, strafing, or rotating by calculating the w, x, y, and z differences between the initial reference quaternion along the chosen axis and the current reading output by the orientation sensor. The differences for each of these variables in the quaternion allows for identification of the position, motion, and acceleration currently being performed by the user.

A threshold may be predetermined to establish when a level of acceleration of movement is sufficient to establish a desired motion, e.g., a movement, rotation or acceleration. In an embodiment, the controller is configured to allow for an adjustable threshold for when the quaternion differentials trigger commands. The larger the desired threshold, the further the user must lean, strafe, or rotate to trigger a command. A smaller threshold value allows for more subtle and nuanced motion to trigger motions.

This flexibility allows the VR motion controller to accommodate different strengths of motion as well as different body shapes and sizes creating different readings. For example, users using the controller while seated may prefer small and subtle movements as sitting in a chair may limit the range and strength of motion available. While standing, users have much more freedom of motion, and as such may prefer the larger threshold values. In addition, because the controller, even when worn correctly, will rest differently on different individuals, similar motions on those users can yield slightly different readings so adjusting the threshold is paramount for creating a consistent experience.

At S530, commands are determined based on the determined user position and motion. It should be noted that while there are a number of different methods available that can determine the motions being made by the user and translate them into controller commands, the quaternion calculations offer specific and distinct advantages. An alternative method involves using Euler angle rotations in a traditional 3D coordinate space to collect the sensor data. However, there are limitations with Euler rotations that make solving movement equations both more complex and more limiting. Euler rotation can be limited by gimbal lock, limiting detection to a single rotational axis, which can occur if the controller is calibrated in certain initial orientations. Additionally, with Euler angles the rotation vectors can also potentially create inaccurate calculations, leading to incorrect commands being triggered. Quaternions provide an efficient method that allows the controller to begin in any initial calibration without the concern for gimbal lock occurring.

At S540, the determined commands are sent to the VR system. In an embodiment, the commands are sent directly to a VR headset, allowing a user to "move around" within the displayed scene. In an alternative embodiment, the commands may be sent to a central unit, such as a console, which is subsequently sent to a VR headset.

Figure 6:
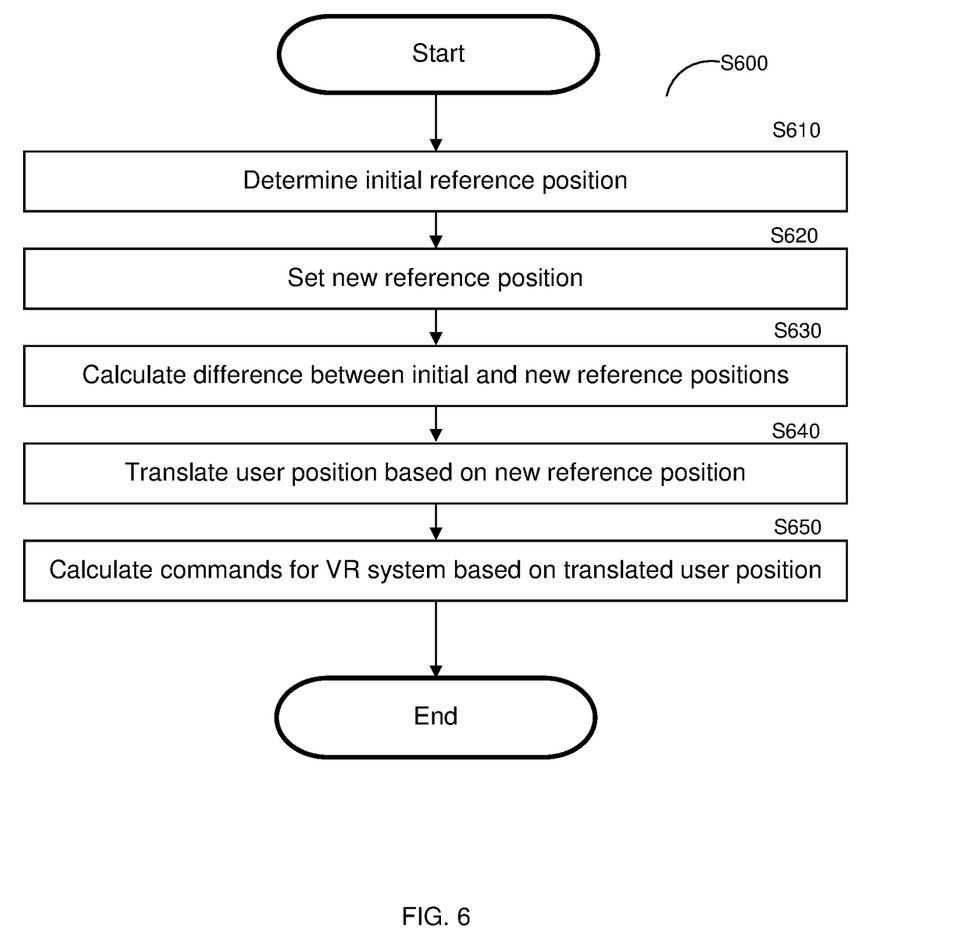
FIG. 6 is a flowchart of a method of recalibrating the reference position of the virtual reality motion controller.

FIG. 6 is a flowchart of a method 600 of recalibrating the reference position of the virtual reality motion controller. At S610, an initial reference position is determined. The initial reference position is based on the sensor readings from the orientation sensor of a VR motion controller. For example, if a user's natural resting position involves a slight lean forward, the initial reference position will determine such a lean forward as a resting position, and no commands will be sent. Consequently, if the user subsequently sits up in a straightened position, the VR motion controller will interpret that position as a lean backwards.

At S620, a new reference position is set. This may be accomplished manually, e.g., when a user selects a recalibration setting, or automatically, e.g., based on the position a user is in at a certain point in time.

At S630, the difference between the initial reference position and the new reference position are calculated. The may be accomplished by solving for the changes in angles, e.g., the quaternion values, between the two positions. In an embodiment, the reference position is determined along a single axis to simplify the calculations. After solving for the new reference position in a simplified quaternion space, i.e., along a single axis, the solution for all subsequent user orientations is calculated by finding the rotation quaternion which allows for the ability to rotate any starting position back to that space. When the controller is calibrated, that reading is stored as a quaternion of the initial orientation reading, and the corresponding rotation quaternion that allows for rotation between the current user space back to the initial reference solved space is calculated. All user orientation readings from the sensor are then rotated by that rotation quaternion to move us back to that simplified space where the desired move commands are known. This means that regardless of the orientation and position of the controller, the controller resorts back to the same solved reference quaternion space where we can easily translate motions to the proper commands to send to the VR headset.

Choosing an initial target quaternion looking down an axis of rotation simplifies the calculations needed to determine commands to send to the VR headset. It also simplifies the threshold calculations for determining a walk versus a run command, as well as any analog signals to be sent if desired. Based on the quaternion difference in the initial reference position and the current user position, we can determine whether the threshold has been reached as well as what motion is being performed. That is, unique differences in the four quaternion values, w, x, y, and z, allow for determining whether a user is moving forward, moving backward, strafing left, strafing right, rotating left, or rotating right, creating a translation table that converts the differences to the appropriate movements to be sent to the VR system.

At S640, a user position determined using the new reference is translated to the reference of the initial reference position, allowing for a more efficient calculation of user positions and motions. At S650, motion commands are calculated based on the translated user positions, and may be sent to a VR system.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A virtual reality (VR) motion controller, comprising:
a processing circuitry;
an orientation sensor;
a communication interface; and
a housing having the processing circuitry, the orientation sensor, and the communication interface disposed therein, the housing further configured to be securely fastened to a body of a user;
wherein the orientation sensor is configured to provide sensor readings indicative of a three-dimensional motion of the user;
wherein the processing circuitry is configured to:
receive the sensor readings from the orientation sensor;
determine an initial reference position based on the sensor readings;
determine a current user position based on the sensor readings; and
translate the initial reference position and the current user position into motion commands using a non-one-to-one ratio between the sensor readings and the motion commands; and
wherein the communication interface is configured to relay the motion commands to a VR device.

2. The VR motion controller of claim 1, further comprising:
a fastener attached to the housing and configured to secure the housing to the chest of the user.

3. The VR motion controller of claim 1, further comprising:
a power source configured to power the processing circuitry, the orientation sensor, and the communication interface, wherein the power source is disposed in the housing.

4. The VR motion controller of claim 1, wherein the orientation sensor is further configured to:
determine a current user position relative to an initial reference position, wherein the position of a user is determined based on the rotation of the orientation sensor along at least one axis.

5. The VR motion controller of claim 1, wherein the current position of a user is determined using quaternion values representing rotation from the initial reference position.

6. The VR motion controller of claim 5, wherein at least one of the quaternion values is computed along a single axis.

7. The VR motion controller of claim 1, wherein the motion commands include at least one of: forward walk, forward run, backward walk, backward run, strafe left walk, strafe left run, strafe right walk, strafe right run, rotate left walk, rotate left run, rotate right walk, and rotate right run.

8. The VR motion controller of claim 1, wherein the processing circuitry is further configured to:
recalibrate the initial reference position based on comparing a new reference position to the initial reference position, such that any subsequent determination of user position is calculated based on the new reference position.

9. The VR motion controller of claim 8, wherein the new reference position is determined by converting quaternion values of the initial reference position to quaternion values of the new reference position.

10. The VR motion controller of claim 1, wherein the processing circuitry is further configured to:
determine the motion commands based on the motion of the user when the sensor readings exceed a predetermined threshold.

11. The VR motion controller of claim 10, wherein the threshold is adjustable.

12. A method for generating motion commands based on detected motion of a user, comprising:
determining an initial reference position;
determining a current user position based on the initial reference position;
translating the initial reference position and the current user position into motion commands using a non-one-to-one ratio between the sensor readings and the motion commands; and
sending the motion commands to a VR device.

13. The method of claim 12, wherein the motion commands include at least one of: forward walk, forward run, backward walk, backward run, strafe left walk, strafe left run, strafe right walk, strafe right run, rotate left walk, rotate left run, rotate right walk, and rotate right run.

14. The method of claim 12, further comprising:
computing the difference between the current user position and the initial reference position using quaternion values to determine current user position is determined.

15. The method of claim 14, wherein at least one of the quaternion values is calculated along a single axis.

16. The method of claim 14, further comprising:
recalibrating the initial reference position based on comparing a new reference position to the initial reference position, such that any subsequent determination of user position is calculated based on the new reference position.

17. The method of claim 16, wherein the new reference position is determined by converting quaternion values of the initial reference position to quaternion values of the new reference position.

18. The method of claim 12, further comprising:
determining the motion commands based on the motion of the user when the sensor readings exceed a predetermined threshold.

19. The method of claim 18, wherein the threshold is adjustable.

20. A non-transitory computer readable medium having stored thereon instructions for causing one or more processing units to execute a process for generating motion commands based on detected motion of a user, the process comprising:
determining an initial reference position;
determining a current user position based on the initial reference position;
determining motion commands based on the determined current user position;
translating the initial reference position and the current user position into motion commands using a non-one-to-one ratio between the sensor readings and the motion commands; and
sending the motion commands to a VR device.

21. A virtual reality (VR) motion controller, comprising:
a processing circuitry;
an orientation sensor;
a communication interface; and
a housing having the processing circuitry, the orientation sensor, and the communication interface disposed therein, the housing further configured to be securely fastened to a body of a user;
wherein the orientation sensor is configured to provide sensor readings indicative of an input three-dimensional motion of the user;
wherein the processing circuitry is configured to:
receive the sensor readings from the orientation sensor;
determine an initial reference position based on the sensor readings;
determine a current user position based on the sensor readings; and
translate the initial reference position and the current user position into output motion commands;
wherein the input three-dimensional motion of the user is a leaning motion where the user is stationary, and the output motion commands is at least one of a translate or a rotate command; and
wherein the communication interface is configured to relay the motion commands to a VR device.

* * * * *